(No Model.)
J. K. FOSTER.
HORSE MEASURING DEVICE.
No. 491,733. Patented Feb. 14, 1893.
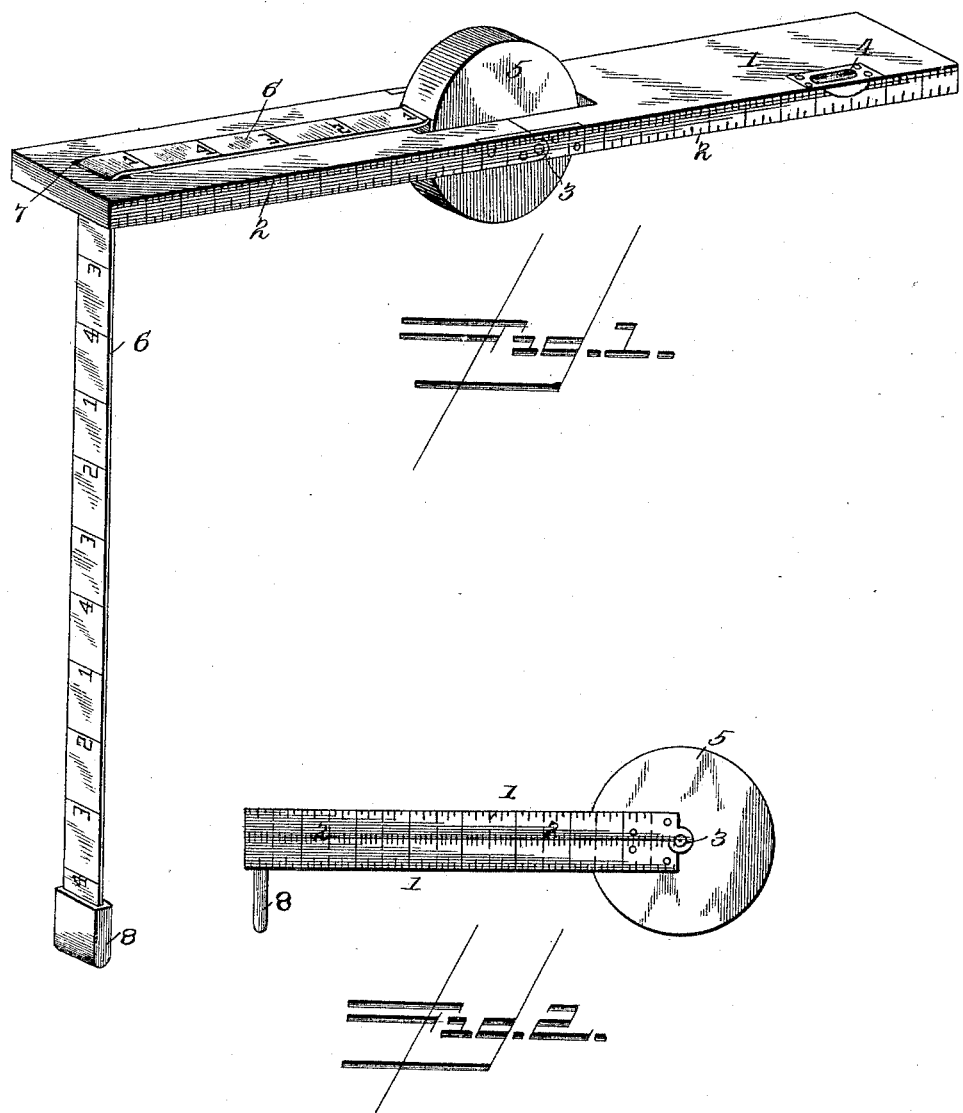
Witnesses
E. K. Stewart.
Chas. S. Hyer
Inventor
John K. Foster.
By his Attorneys,
C. A. Snow & Co.

UNITED STATES PATENT OFFICE.

JOHN K. FOSTER, OF GREENVILLE, OHIO.

HORSE-MEASURING DEVICE.

SPECIFICATION forming part of Letters Patent No. 491,733, dated February 14, 1893.

Application filed June 30, 1892. Serial No. 438,602. (No model.)

*To all whom it may concern:*

Be it known that I, JOHN K. FOSTER, a citizen of the United States, residing at Greenville, in the county of Darke and State of Ohio, have invented a new and useful Horse-Measuring Standard, of which the following is a specification.

This invention relates to certain new and useful improvements in horse measuring devices or standards and has for its object to provide a folding device, having a measuring tape in connection therewith which is adapted to be used for ascertaining the height and other dimensions of an animal, and consists of the construction and arrangement of parts as will be more fully hereinafter described and claimed.

In the drawings:—Figure 1 is a perspective view of the improved device, showing it arranged for use. Fig. 2 is a side elevation of the device shown folded.

Similar numerals of reference are employed to indicate corresponding parts in both the figures.

Referring to the drawings the numeral 1 designates a wooden support preferably a foot long and divided into inches and fractions thereof as at 2, and having a central hinge or joint 3. Adjacent to one end of the support and at one edge thereof, is a spirit level 4, whereby a true horizontal position or perpendicular of the said support may be ascertained. In the central portion of the support and surrounding the hinge or joint thereof, is a casing 5, containing a suitable spring having a tape 6, in connection therewith and operating in a well known manner. The said tape 6, passes through a slot 7, near one end of the support and has a plumb-bob 8, connected to the lower end thereof. One side of the tape is divided into hands for the measurement of the height of a horse, and the opposite side of the same into feet and inches and fractions of the same, thereby adapting the tape to be used for linear measurements in addition to taking the measure of the height of a horse or other animal.

The device is adapted to be folded in compact form as shown in Fig. 2, and in this arrangement the tape 6, will be wound up within the casing 5, and the plumb-bob 8, will have bearing against the under side of the support, as fully shown.

In using the device for measuring the height of horses the end of the support having the spirit level in connection therewith is rested on the withers of the animal and the plumb-bob is caused to touch the ground when the number of hands may be readily ascertained and the support held in a perfectly true and level position. It will be seen that when the device is folded it will occupy just half the space as when in position for use as shown in Fig. 1.

The device as a whole is simple and effective in its construction and operation and is easily and readily applied.

Having thus described the invention, what is claimed as new is:—

1. In a device of the character set forth, the combination of a folding support having a spirit level in connection with one end thereof, and a slot in the opposite end, said support being provided with a central hinge or joint, a casing centrally located in said support, and mounted on the pivot of said hinge or joint, and extending transversely through opposite sides of said support and a spring actuated tape in connection with said casing provided with a hands scale on one side and feet and inches on the opposite side, said tape passing through said slot and having a plumb-bob on the free end thereof, substantially as described.

2. In a device of the character set forth, the combination of a jointed support having scale marks thereon a casing mounted in said support and supported by the pivot of the joint thereof, and a spring actuated tape mounted in connection with said casing and movably extending through one end of said support, substantially as described.

In testimony that I claim the foregoing as my own I have hereto affixed my signature in the presence of two witnesses.

JOHN K. FOSTER.

Witnesses:
W. N. STUBBS,
J. P. DUFFEY.